US007003084B2

(12) United States Patent
Yoon et al.

(10) Patent No.: US 7,003,084 B2
(45) Date of Patent: Feb. 21, 2006

(54) TELEPHONE-CONTROLLED HOME APPLIANCE SYSTEM AND METHOD FOR CONTROLLING THE SAME

(75) Inventors: Sang Chul Yoon, Kyungki-do (KR); Duck Gu Jeon, Seoul (KR); Jae Sik Jung, Seoul (KR); Jae Hwan Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/701,461

(22) Filed: Nov. 6, 2003

(65) Prior Publication Data

US 2004/0114734 A1   Jun. 17, 2004

(30) Foreign Application Priority Data

Dec. 10, 2002   (KR) ...................... 10-2002-0078329

(51) Int. Cl.
*H04M 11/00*   (2006.01)
(52) U.S. Cl. ................................. 379/102.01
(58) Field of Classification Search ............................... 379/102.01–102.07, 93.23, 82, 179, 207.08, 379/207.09, 207.16, 252, 74
See application file for complete search history.

(56) References Cited

U.S. PATENT DOCUMENTS

| | | | | |
|---|---|---|---|---|
| 3,783,193 A | * | 1/1974 | Lee | 379/102.01 |
| 4,070,549 A | * | 1/1978 | Baker | 379/102.01 |
| 4,538,031 A | * | 8/1985 | Benning et al. | 379/102.06 |
| 4,885,766 A | | 12/1989 | Yasuoka et al. | |
| 5,127,045 A | * | 6/1992 | Cragun et al. | 379/67.1 |
| 5,548,635 A | | 8/1996 | Bradley et al. | |
| 5,771,281 A | * | 6/1998 | Batten, Jr. | 379/93.23 |
| 5,905,843 A | * | 5/1999 | Kim et al. | 379/102.03 |

FOREIGN PATENT DOCUMENTS

| | | |
|---|---|---|
| KR | 1997-0012295 | 3/1997 |
| KR | 1998-053072 | 9/1998 |
| KR | 2001-0112559 | 12/2001 |
| WO | 85/03159 | 7/1985 |

OTHER PUBLICATIONS

English Language Abstract of KR 1998-053072.
English Language Abstract of KR 1997-0012295.
English Language Abstract of KR 2001-0112559.

* cited by examiner

*Primary Examiner*—Wing Chan
(74) *Attorney, Agent, or Firm*—Greenblum & Bernstein, P.L.C.

(57) ABSTRACT

A telephone-controlled home appliance system and a method for controlling the same are provided. Thus, a remote user can remotely control a plurality of home appliances inside of a home using a remote telephone. A telephone control module is contained in each of the home appliances to detect ringing signals received over a telephone line. If the number of the detected ringing signals is equal to a predetermined reference value, each home appliance automatically enters an off-hook state to make a call connection with the remote telephone. Even though a plurality of telephone jacks are commonly connected to the telephone line and the home appliances are in turn connected to respective telephone jacks, the user can access the respective home appliances from a remote site to simultaneously/individually control them. Therefore, the plurality of home appliances can be remotely controlled over the telephone line in a simple manner.

10 Claims, 7 Drawing Sheets

TELEPHONE-CONTROLLED HOME APPLIANCE SYSTEM AND METHOD FOR CONTROLLING THE SAME

RELATED APPLICATION

The present application relates to subject matter contained in Korean Application No. 10-2002-0078329, filed on Dec. 10, 2002, which is expressly incorporated herein by reference in its entirety.

BACKGROUND OF THE INVENTION

1. Field of the Invention

The present invention relates to telephone-controlled home appliance systems and methods for controlling the same. More particularly, the present invention relates to a telephone-controlled home appliance system and a method for controlling the same, wherein a plurality of home appliances each include a telephone control module for receiving ringing signals, are configured to count the number of the received ringing signals and to automatically enter an off-hook state in accordance with the result. Thus, the home appliances can be simultaneously/individually controlled in a home through the use of a remote telephone even though they are commonly connected to the same telephone line.

2. Description of the Related Art

In the present specification, home appliances according to the conventional and present systems will be described to be air conditioners, merely for illustrative and non-limiting purposes.

Recently, home network systems have been proposed in which users outside of homes or buildings can remotely control home appliances inside of the homes or the buildings. In an initial home network system, as shown in FIG. 1, an air conditioner 1 includes a modem 2 connected with an Internet network, and is assigned a fixed Internet protocol (IP), address. A remote user can control the operation of the air conditioner 1 through the use of an Internet medium, such as a personal computer (PC) connectable with the Internet network.

However, in the above-mentioned home network system, there is a concern that a great cost could be required in assigning fixed IP addresses to home appliances and the fixed IP addresses to be assigned to the home appliances could be overissued. Further, for operation of the above-described home network system, it is essential to install an Internet line in the building itself, resulting in a considerable economic cost.

In a region having a previously constructed Internet network, it is possible to use the home network system through the Internet network by establishing additional facilities of the Internet network and incurring a fee for the use thereof. However, in a region or country where access to Internet facilities is poor, it is impossible to use the above-described home network system.

One approach to overcoming the above problem is a home network system which is capable of controlling home appliances using a telephone line, thus not requiring the use of the Internet. In such a home network system, however, all home appliances must be assigned different telephone numbers so that they can be externally identified. For this reason, only a small number of specific home appliances can be used and a great cost is required in installing and maintaining telephone numbers respectively assigned to the specific home appliances.

Provided that a plurality of home appliances can be commonly connected to one telephone number, the wasteful assignment of unnecessary telephone numbers will be avoided. In this case, however, it is difficult to operate the home appliances at the same time due to a signal delay on a telephone line corresponding to the telephone number, etc. That is, if a closest one of the home appliances to the telephone line first receives a ringing signal, it is in turn connected to a remote calling party via the telephone line to receive a control signal transmitted therefrom. However, the other home appliances cannot receive the transmitted control signal. As a result, it is not possible to control the home appliances at the same time, resulting in inconvenience in use of the control system.

SUMMARY OF THE INVENTION

Therefore, the present invention has been made in view of the above problems, and it is an object of the present invention to provide a telephone-controlled home appliance system and a method for controlling the same, wherein a user conducts a voice conversation with a general telephone in a home from a remote telephone, or makes a call connection with all home appliances connected to the same telephone line (single telephone number) as that of the general telephone from the remote telephone, thereby enabling the home appliances to stably detect ringing signals so that they can be simultaneously/individually controlled from a remote site.

In accordance with one aspect of the present invention, the above and other objects can be accomplished by the provision of a telephone-controlled home appliance system including a plurality of telephone jacks commonly connected to the same telephone line installed in a home, the telephone jacks receiving ringing signals transmitted from a central office. A plurality of home appliances are respectively connected to the telephone jacks. A microcomputer is installed in each of the home appliances and, if the number of the ringing signals received through a corresponding one of the telephone jacks connected with a corresponding one of the home appliances is equal to a predetermined reference value, outputs an off-hook control signal to connect a call signal line with the corresponding telephone jack in an off-hook mode. A telephone controller is installed in each of the home appliances for modulating the ringing signals received through the corresponding telephone jack into pulse signals whose number is to be counted by the microcomputer. The controller sets the call signal line connected with the corresponding telephone jack to the off-hook mode in response to a off-hook control signal from the microcomputer.

In accordance with another aspect of the present invention, a method is provided for controlling a telephone-controlled home appliance system. The method includes receiving ringing signals from a central office and modulating the received ringing signals into pulse signals. The number of the modulated pulse signals is counted and at least one call signal line is set to an off-hook mode if the counted number has reached a predetermined reference value. A call signal is received from a calling party via the central office when the call signal line is set to the off-hook mode and at least one home appliance connected with the call signal line is controlled in response to the received call signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Preferred embodiments of the present invention will now be described in detail with reference to the annexed drawings. In the following description, home appliances will be described to be air conditioners for illustrative purposes only, although they may be washing machines, boilers, or other home appliances. Further, although the present application utilizes the term "home appliances", it is expressly within the scope of the present invention to control appropriate appliances and machines in all types of buildings such as schools, offices, and factories. The types of machines and appliances controlled in those buildings are those appropriate to the uses and functions of the respective buildings.

Figure 1:
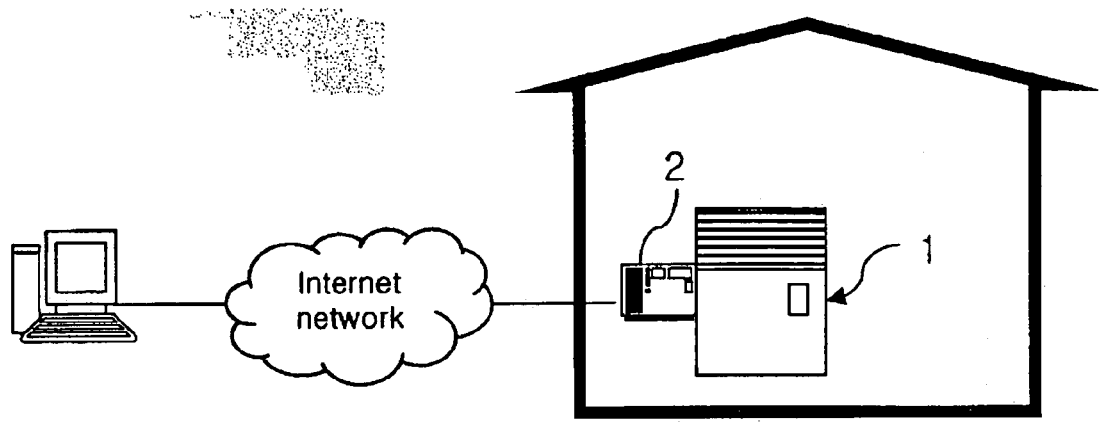
FIG. 1 is a schematic view showing the construction of a conventional home network system.
Figure 2:
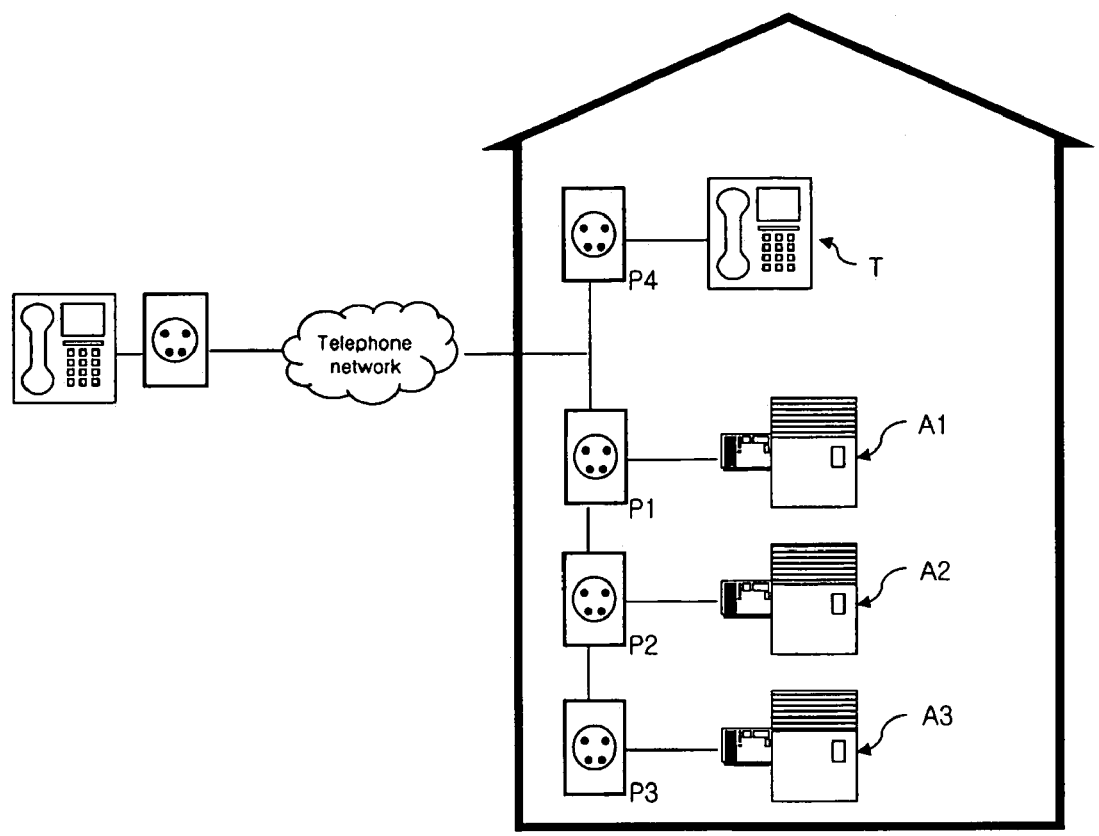
FIG. 2 is a view showing the construction of a first embodiment of a telephone-controlled home appliance system in accordance with the present invention.

FIG. 2 shows the construction of a first embodiment of a telephone-controlled home appliance system in accordance with the present invention. As shown in this drawing, the telephone-controlled home appliance system comprises a plurality of telephone jacks P1–P4 commonly connected to the same telephone line installed in a home, a plurality of air conditioners A1–A3 respectively connected to the telephone jacks P1–P3, and a general telephone T connected to the telephone jack P4. The telephone jacks P1–P4, commonly connected to the same telephone line installed in the home, are connectable with a remote telephone over a telephone network. As a result, the remote telephone can transmit not only a voice signal to the general telephone T connected to the telephone jack P4, but also a control signal to the air conditioners A1–A3 connected to the telephone jacks P1–P3.

The air conditioners A1–A3 connected to the telephone jacks P1–P3 may be of a type where one indoor unit and one outdoor unit are paired, or a type where a plurality of indoor units are connected to one outdoor unit.

Figure 3:
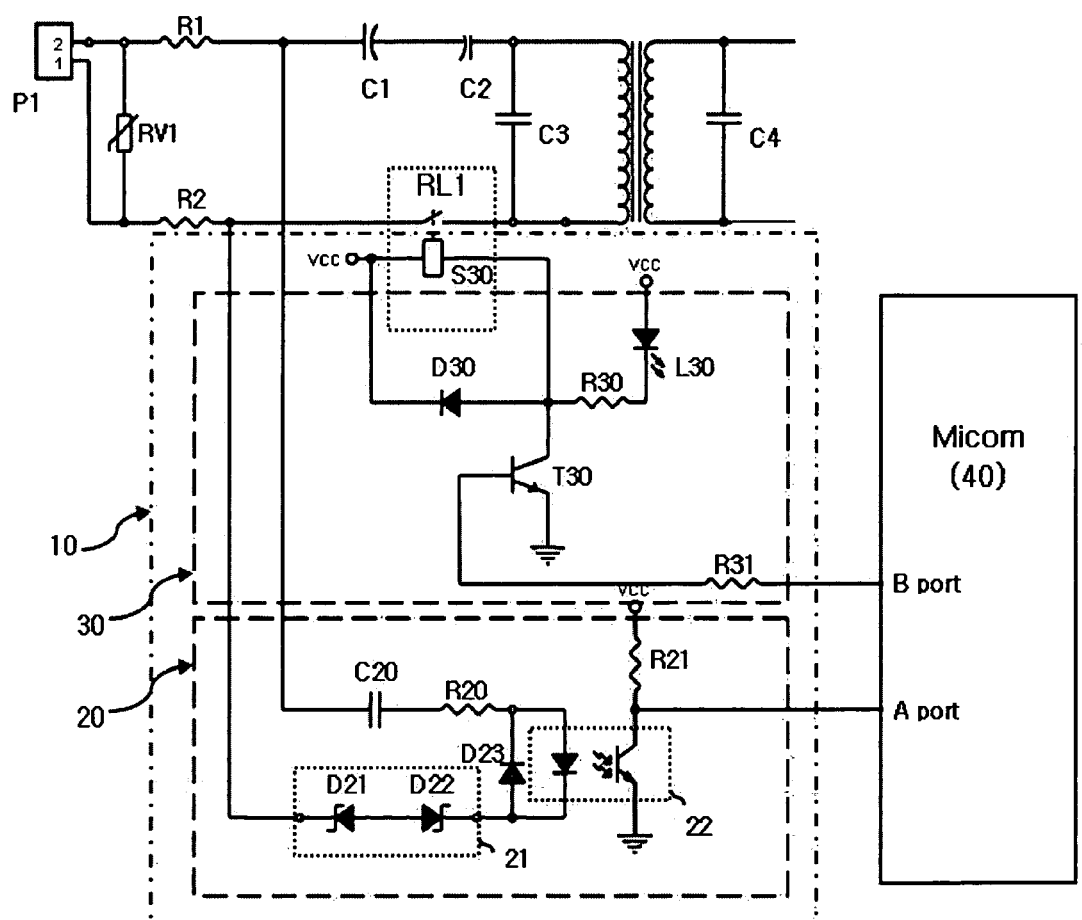
FIG. 3 is a circuit diagram of a telephone control module contained in each home appliance in FIG. 2.

In the first embodiment, the home appliance, for example, the air conditioner A1 includes, as shown in FIG. 3, a telephone control module 10 connected to the telephone jack P1 for modulating ringing signals received through the telephone jack P1 into pulse signals. The telephone control module 10 also functions to control an on/off-hook operation so that the air conditioner A1 can transmit and receive signals through the telephone jack P1. The air conditioner A1 further includes a microcomputer 40 for counting the number of the modulated pulse signals from the telephone control module 10 and sending an off-hook control signal to the telephone control module 10 if the counted number of modulated pulse signals reaches a predetermined reference value (for example, 4).

The telephone control module 10 turns on a relay RL1 connected to the telephone jack P1 in response to the off-hook control signal from the microcomputer 40 to make a call connection with the remote telephone. If the relay RL1 is turned on, then a call signal received through the telephone jack P1 is applied to the air conditioner A1 through a pair of resistors R1 and R2, a plurality of capacitors C1–C4 and a transformer. The, call signal is a dual-tone multifrequency (DTMF) signal generated by dialing the remote telephone, which contains a control command for the air conditioner desired by a remote user.

The telephone control module 10 includes a ringing signal modulation circuit 20 for modulating the ringing signals received through the telephone jack P1 into the pulse signals so that the number of signals can be counted by the microcomputer 40, and a hook switching circuit 30 is provided for turning ON the relay RL1 in response to the off-hook control signal which is sent from the microcomputer 40 as a result of the counting of the number of the modulated pulse signals from the ringing signal modulation circuit 20.

The ringing signal modulation circuit 20 includes a clipper 21 for clipping each of the ringing signals received through the telephone jack P1 if it is above a predetermined threshold level, a photocoupler 22 for applying an output signal from the clipper 21 to the microcomputer 40, a diode D23 connected in parallel to the photocoupler 22 for preventing a reverse signal flow, a capacitor C20 and resistor R20 connected in series between the telephone jack P1 and the photocoupler 22, and a resistor R21 for applying a supply voltage Vcc to the photocoupler 22. The clipper 21 is provided with a pair of Zener diodes D21 and D22 connected in series for clipping an input voltage that is greater than the predetermined threshold level.

The photocoupler 22 is very resistant to noise and is mainly used to electrically isolate devices having different ground levels from each other. As stated above, the telephone control module 10 transfers the ringing signals to the microcomputer 40 via the photocoupler 22.

The hook switching circuit 30 includes a transistor T30 that is turned on in response to the off-hook control signal from the microcomputer 40 for applying the supply voltage Vcc to the relay RL1, a switch S30 for controlling an on/off operation of the relay RL1 in response to an on/off operation of the transistor T30, a diode D30 for preventing a reverse signal flow, a resistor R30 for applying the supply voltage Vcc to the transistor T30, and a light emitting diode (LED) L30 that is turned ON upon having the supply voltage Vcc applied thereto.

By the above construction, a signal input to the photocoupler 22 is transferred to an input port A of the microcomputer 40 by means of the pull-up resistor R21. The microcomputer 40 counts the number of pulses periodically input at its input port A and outputs the off-hook control signal through its output port B if the counted number reaches the predetermined reference value (for example, 4). The relay RL1 is turned on in-response to the off-hook control signal, so as to close the switch S30. As a result, a loop is formed in which the call signal with the control command received through the telephone jack P1 is transferred through the transformer.

Figure 4A:
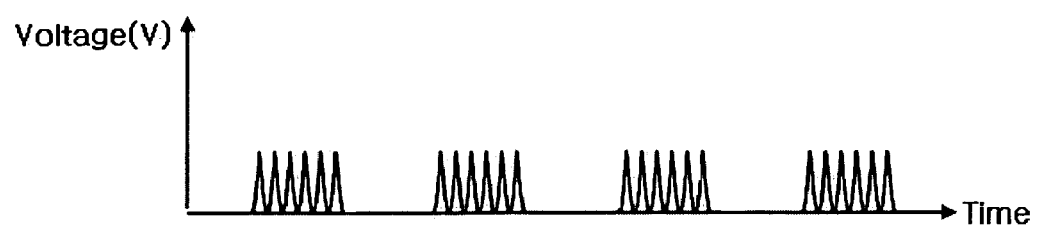
FIGS. 4a to 4d are waveform diagrams of signals generated in the telephone control module of FIG. 3.
Figure 4B:
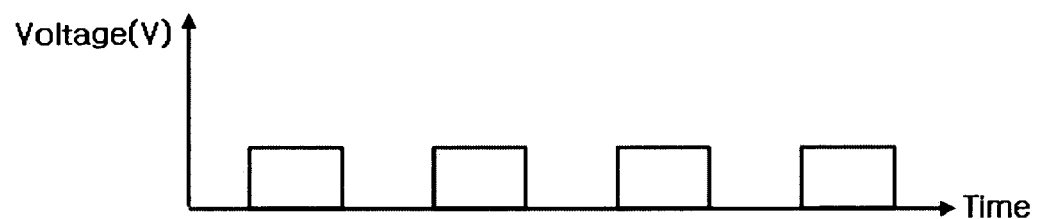

FIG. 4a is a waveform diagram of ringing signals input to the clipper 21 in the ringing signal modulation circuit 20, and FIG. 4b is a waveform diagram of pulse signals output from the photocoupler 22 in the ringing signal modulation circuit 20 to the microcomputer 40. The microcomputer 40 counts the number of the pulse signals from the photocoupler 22 and outputs the off-hook control signal to the hook switching circuit 30 if the counted number of pulse signals reaches the predetermined reference value (for example, 4).

For reference, a brief description will hereinafter be given of a conventional system, not based on the ring detection algorithm of the microcomputer 40 according to the present invention, with reference to FIG. 2.

Note that the air conditioners A1–A3 have different physical distances to the telephone network according to their different locations, and different ringing signal arrival times according to different processing rates of their telephone jacks or internal circuits. Further, the time intervals of ringing may be different according to regions or time zones, causing different ringing signal arrival times and hold times.

At the instant that the first air conditioner A1 first receives a ringing signal through the telephone jack P1 by a shade of difference, it automatically enters an off-hook state. At this time, a central office recognizes a load state of the called party, or the first air conditioner A1, and thus makes a call connection between the calling party, or the remote telephone, and the called party. Accordingly, the air conditioners A2 and A3 connected to the telephone jacks P2 and P3, other than the air conditioner Al with the initial call connection with the calling party, can not receive a ringing signal. In this connection, where the user desires to remotely control the air conditioner A2 using the remote telephone, he/she cannot remotely control it because the call connection can not be made with any other air conditioners other than the air conditioner A1.

In order to solve the above problem, in the first embodiment, the microcomputer 40, built into each of the air conditioners A1–A3 of the telephone-controlled home appliance system, is implemented so as to overcome a difference among the ringing signal arrival times and effect a call connection between the calling party and the corresponding air conditioner. Towards this end, the microcomputer 40 counts the number of ringing signals and outputs the off-hook control signal at the moment that the counted number reaches the predetermined reference value. At this time, the microcomputer 40 counts the number of rising edges of pulse signals obtained by modulating the ringing signals. Accordingly, the call connection can be made between the calling party and all of the air conditioners.

Figure 4C:
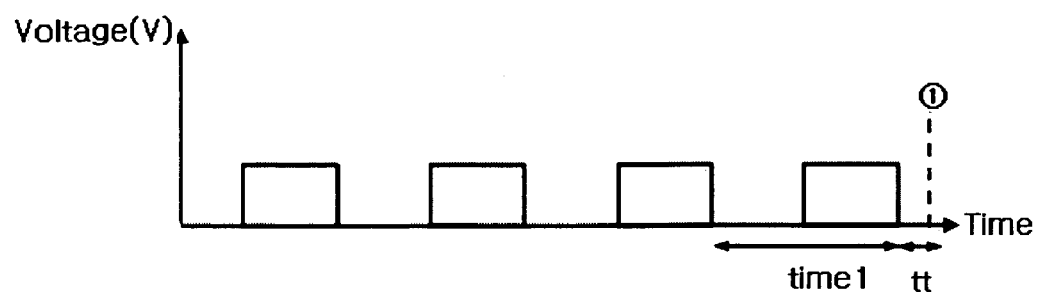

In a second embodiment of the telephone-controlled home appliance system according to the present invention, the microcomputer contained in or connected to each air conditioner is implemented or configured to output the off-hook control signal, not upon the completion of the pulse signal input, but at a point of time ① after the lapse of a brief time period from the completion of the pulse signal input, as shown in FIG. 4c.

In other words, in the second embodiment, the microcomputer not only counts the number of rising edges of pulse signals, but also waits for the detection of a subsequent rising edge for a ring detection period time1. If the subsequent rising edge has been input during the ring detection period time1, the microcomputer increments the counted number of ringing signals by one and outputs the off-hook control signal if the accumulated number reaches the predetermined reference value (for example, 4). At this time, the off-hook control signal is output after the lapse of a predetermined time tt after the arrival of the fourth pulse signal.

The ring detection period time1 may be modified by manufacturers because it may differ according to regions. It is preferably set to be longer than a general ringing signal period in consideration of a difference among ringing signal arrival times. Therefore, even though ringing signal arrival times at the telephone jacks P1 to P3 are different in accordance with different physical environments, all the plurality of air conditioners connected to the same telephone line can enter the off-hook state.

In a third embodiment of the telephone-controlled home appliance system according to the present invention, an automatic answering unit is connected to the same telephone line as the air conditioners instead of the general telephone T in FIG. 2. The automatic answering unit functions to automatically receive a call upon receiving a desired number of ringing signals.

The automatic answering unit is generally adapted to, upon receiving the desired number of ringing signals, automatically enter the off-hook state to output an automatic answering voice signal to a calling party. Assuming that the automatic answering unit enters the off-hook state upon receiving three ringing signals, the user, desiring to remotely control the air conditioners A1 to A3 using the remote telephone, cannot make a call connection with the telephone control module provided in each of the air conditioners A1 to A3, since the automatic answering unit is connected with the calling party earlier than (i.e. upstream of) the air conditioners A1 to A3 on the same telephone line.

Figure 4D:
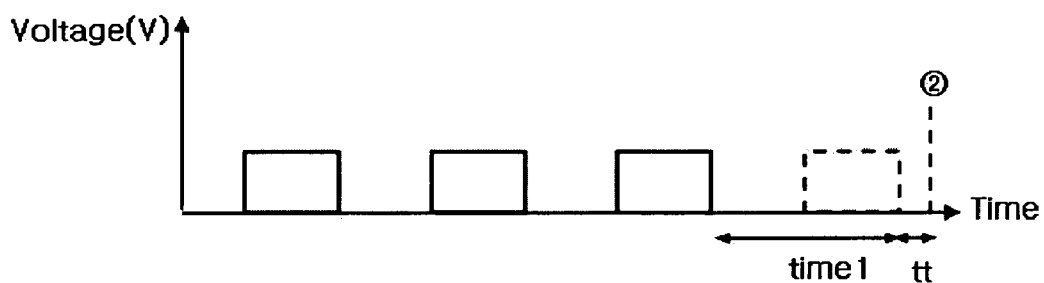

In order to overcome the above problem, the microcomputer according to the third embodiment of the present invention waits for a fourth ringing signal to be received for the ring detection period time1 even though the automatic answering unit is operated after receiving three ringing signals, as shown in FIG. 4d. If no fourth ringing signal is received even when the ring detection period time1 has elapsed, then the microcomputer outputs the off-hook control signal to the hook switching circuit 30 at a point of time ② after the lapse of the predetermined time tt from the ring detection period time1.

Accordingly, even in the case where the automatic answering unit is operated in advance, each air conditioner can be connected to the telephone line so that it can receive a control call signal (DTMF signal) transmitted from the calling party. Where the calling party intends not to remotely control the air conditioners, but to record a voice message, the microcomputer determines whether a control call signal (DTMF signal) is received, while holding a call connection state for a predetermined period of time. If no DTMF signal is received even when the predetermined time period has elapsed, then the microcomputer outputs an on-hook control signal and releases the call connection state. Here, the time period for which each air conditioner holds the call connection state to wait for a DTMF signal to be received is referred to as a call connection hold time.

A detailed description will hereinafter be given of the operation of the telephone-controlled home appliance system with the above-stated construction in accordance with the present invention.

First, the operation of the second embodiment of the telephone-controlled home appliance system according to the present invention will be described with reference to FIG. 5. In the second embodiment, no automatic answering unit is connected to the telephone line.

At the first step S1, a ringing signal modulation circuit detects a ringing signal received through an associated telephone jack, modulates the detected ringing signal into a pulse signal and outputs the modulated pulse signal to an associated microcomputer.

At the second step S2, the microcomputer receives the modulated pulse signal and determines whether a rising edge of the received pulse signal is detected.

Unless a rising edge of the pulse signal is detected, the microcomputer waits for a subsequent pulse signal to be inputted. If a rising edge is detected, then the microcomputer increments the counted number of rising edges by one at the third step S3.

At the fourth step S4, the microcomputer determines whether the resulting counted number at the third step S3 has reached a predetermined reference value (for example, 4).

If the counted number is below the predetermined reference value, the microcomputer counts a time elapsed since the rising edge detection at the fifth step S5.

At the sixth step S6, the microcomputer determines whether the elapsed time counted at the fifth step S5 has reached a ring detection period time1.

In the case where the time elapsed since the rising edge detection is less than the ring detection period time1, the microcomputer returns to the fifth step S5 to continue to count the elapsed time. If the elapsed time has reached the ring detection period time1, then the microcomputer returns to the second step S2 to wait for a rising edge based on a new ringing signal to be detected.

If the counted number is determined to have reached the predetermined reference value at the fourth step S4, then the microcomputer outputs an off-hook control signal at the seventh step S7 such that an associated air conditioner is connected to the telephone line. As a result, at the eighth step S8, a control call signal is transmitted to the air conditioner to control it.

Compared with the second embodiment, in the first embodiment, the microcomputer returns to the second step S2 directly without performing the fifth step S5 and sixth step S6.

Figure 6:
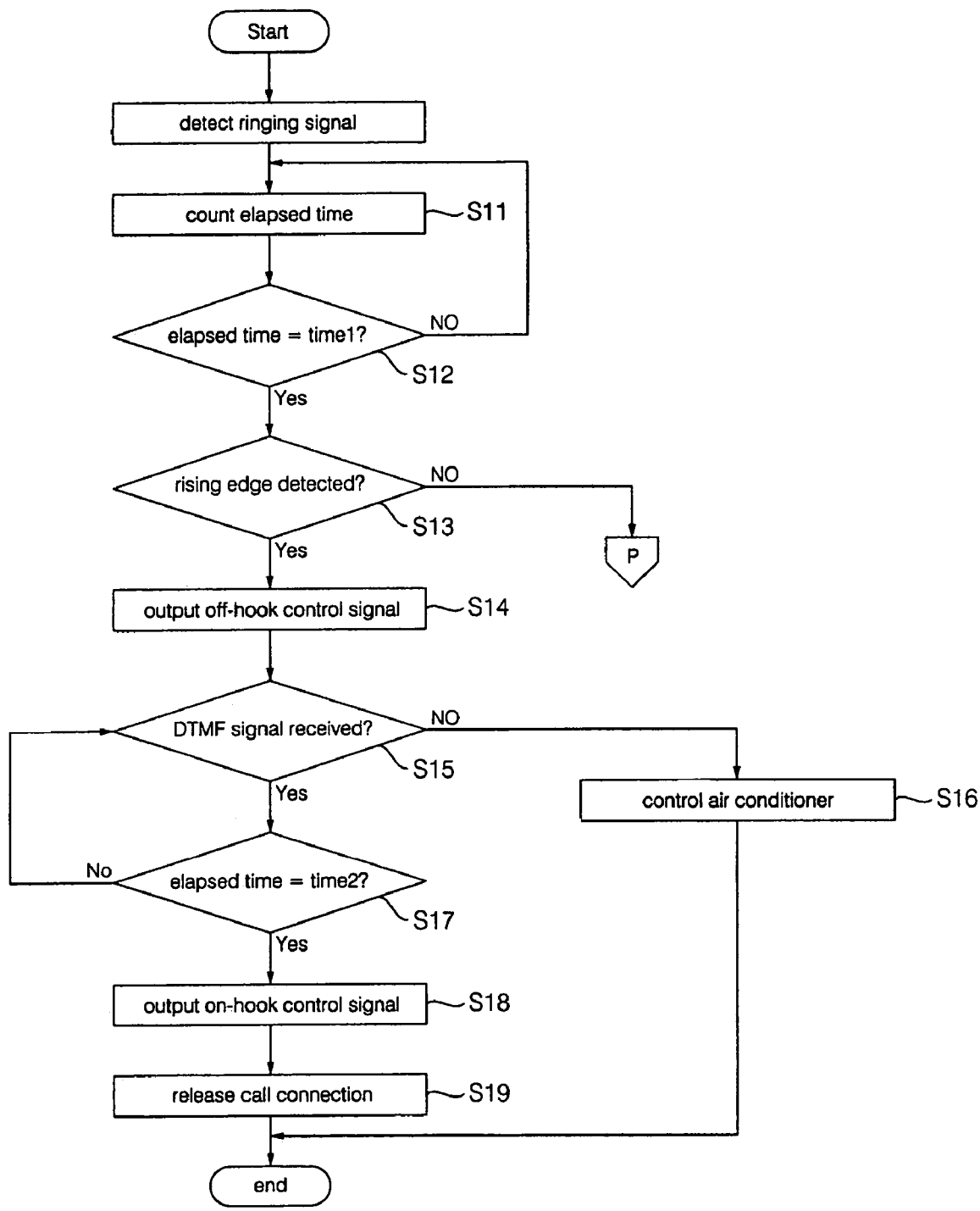
FIG. 6 is a flow chart illustrating the operation of a third embodiment of the telephone-controlled home appliance system in accordance with the present invention.

FIG. 6 is a flow chart illustrating the operation of the third embodiment of the telephone-controlled home appliance system in accordance with the present invention. In the third embodiment, an automatic answering unit is connected to the telephone line and, operated in an automatic answering mode upon detecting a desired number of, for example, three ringing signals.

First, if no further rising edge is detected after three rising edges are detected, a microcomputer counts a time elapsed from the detection of the third rising edge, at the eleventh step S11 and determines at the twelfth step S12 whether the elapsed time has reached a ring detection period time1 (adjustable according to specifications of an associated air conditioner or the automatic answering unit, or ringing signal standards by regions). Unless the elapsed time has reached the ring detection period time1, the microcomputer returns to the eleventh step S11 to continue to count the elapsed time. If the elapsed time has reached the ring detection period time1, then the microcomputer proceeds to the thirteenth step S13 to determine whether a subsequent rising edge is detected.

Figure 5:
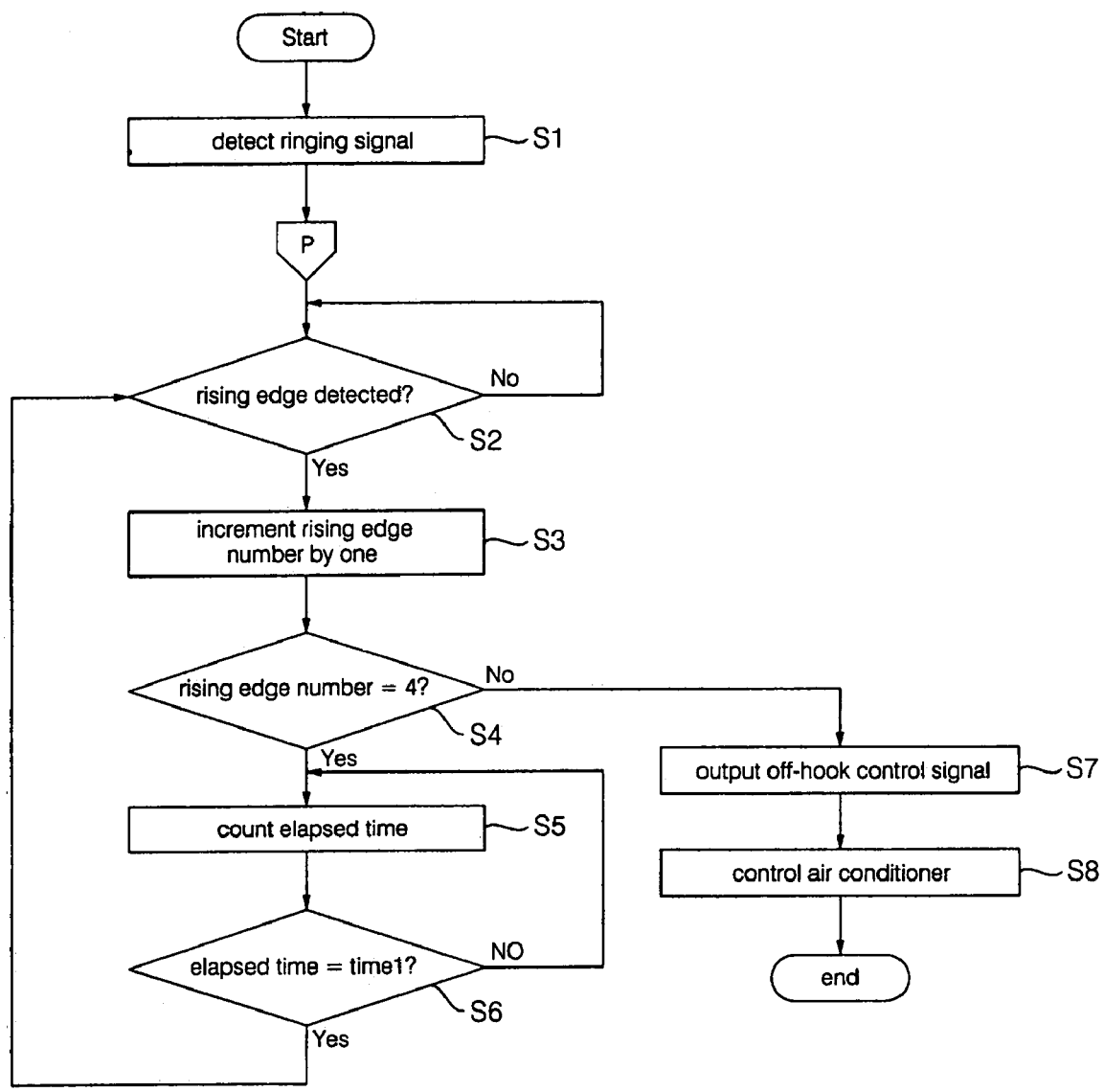
FIG. 5 is a flow chart illustrating the operation of a second embodiment of the telephone-controlled home appliance system in accordance with the present invention.

If a subsequent rising edge is determined to be detected at the thirteenth step S13, then the microcomputer proceeds to step P to increment the counted number of rising edges by one and output an off-hook control signal if the resulting counted number has reached a predetermined reference value, as in the operation of the second embodiment shown in FIG. 5.

On the other hand, in the case where no subsequent rising edge is determined to be detected at the thirteenth step S13, the microcomputer recognizes that the automatic answering unit has automatically entered a call connection state, and then outputs the off-hook control signal to an associated hook switching circuit at the fourteenth step S14 to attempt a call connection of the air conditioner with a calling party.

If the off-hook control signal is output and the call connection is made between the calling party and the air conditioner at the fourteenth step S14, then the microcomputer determines at the fifteenth step S15 whether a DTMF signal containing a control command for the air conditioner is received from the calling party.

If a DTMF signal is received, then the microcomputer controls the air conditioner in response to a control command contained in the received DTMF signal at the sixteenth step S16. However, in the case where no DTMF signal is received, the microcomputer recognizes that the calling party is not a remote user intending to control the air conditioner, but a typical caller intending to leave a voice message. As a result, the microcomputer determines at the seventeenth step, S17 whether the elapsed time has reached a call connection hold time time2.

In the case where the elapsed time has not reached, the call connection hold time time2, the microcomputer returns to the fifteenth step S15 to continuously determine whether a DTMF signal is received. However, if the elapsed time has reached the call connection hold time time2, then the microcomputer outputs an on-hook control signal to the hook switching circuit at the eighteenth step S18. As a result, the call connection between the air conditioner and the calling party is released at the nineteenth step S19.

As apparent from the above description, the present invention provides a telephone-controlled home appliance system and a method for controlling the same, wherein a plurality of home appliances are commonly connected to the same telephone line, such as a general (i.e. ordinary) telephone or automatic answering unit. A telephone control module is contained in each of the home appliances and has a ring detection algorithm for correcting an environmental parameter, deviation, etc. on the telephone line such that all the home appliances enter a call connection state after a predetermined number of ringing signals are input. Therefore, the plurality of home appliances connected in common to the same telephone line can be individually/simultaneously controlled from a remote site, thereby enabling a user to more conveniently control the home appliances. Further, there is no need to install a separate telephone number, resulting in control cost. This contributes to an increase in the widespread utilization of the home appliance system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A telephone-controlled home appliance system comprising:
   a plurality of telephone jacks commonly connected to a same telephone line, said telephone jacks receiving ringing signals transmitted from a central office;
   a plurality of home appliances respectively connected to said telephone jacks;
   a microcomputer installed in each of said home appliances, each of said microprocessors configured such that when the number of the ringing signals received through a corresponding one of said telephone jacks connected with a corresponding one of said home appliances is equal to a predetermined reference value, the microprocessor outputs an off-hook control signal to set a call signal line connected with the corresponding telephone jack to an off-hook mode; and a telephone controller installed in each of said home appliances for modulating said ringing signals received through said corresponding telephone jack into pulse signals, a number of said pulse signals counted by said microcomputer and setting said call signal line connected with said corresponding telephone jack to said off-hook mode in response to said off-hook control signal from said microcomputer.

2. The telephone-controlled home appliance system according to claim 1, wherein said telephone controller comprises:

a ringing signal modulator that modulates said ringing signals received through said corresponding telephone jack into said pulse signals and outputs the modulated pulse signals to said microcomputer; and a hook switch circuit that sets said call signal line connected with said corresponding telephone jack to said off-hook mode in response to said off-hook control signal from said microcomputer.

3. The telephone-controlled home appliance system according to claim 2, wherein said ringing signal modulator comprises:

a clipper that clips each of said ringing signals received through said corresponding telephone jack when said ringing signal is above a predetermined threshold level; and a photocoupler that applies an output signal from said clipper to said microcomputer.

4. The telephone-controlled home appliance system according to claim 3, wherein said clipper includes a pair of Zener diodes connected in series.

5. The telephone-controlled home appliance system according to claim 2, wherein said microcomputer is configured to count the number of rising edges of said pulse signals from said ringing signal modulator and output said off-hook control signal when the counted number has reached said predetermined reference value.

6. The telephone-controlled home appliance system according to claim 5, wherein said microcomputer is configured to count the number of rising edges after lapse of a predetermined period of time from the reception of each of said pulse signals from said ringing signal modulator.

7. The telephone-controlled home appliance system according to claim 2, wherein said hook switch circuit includes a transistor that is turned ON in response to said off-hook control signal from said microcomputer to apply a supply voltage to a relay connected to said call signal line.

8. The telephone-controlled home appliance system according to claim 1, further comprising an automatic answering unit that receives the ringing signals transmitted from said central office and, when the number of the received ringing signals is equal to a second predetermined reference value, automatically entering a call connection state to perform an automatic answering operation.

9. The telephone-controlled home appliance system according to claim 8, wherein said microcomputer is configured, when a pulse signal is not received from said telephone controller within a predetermined period of time after the number of said pulse signals from said telephone controller has reached said second predetermined reference value, to recognize that said automatic answering unit is in operation and to output said off-hook control signal to set said call signal line connected with said corresponding telephone jack to said off-hook mode.

10. The telephone-controlled home appliance system as set forth in claim 1, wherein said home appliances are each controlled according to a dual-tone multifrequency (DTMF) signal, said DTMF signal being received through said corresponding telephone jack when said call signal line is set to said off-hook mode.

* * * * *